US009661872B2

United States Patent
Dawoodi et al.

(10) Patent No.: US 9,661,872 B2
(45) Date of Patent: May 30, 2017

(54) POST FILL CARBONATION WITH CONTAINER OVERPRESSURE LIMITATION

(71) Applicant: PepsiCo, Inc., Purchase, NY (US)

(72) Inventors: Taher Shabbir Dawoodi, Hicksville, NY (US); John A. Eaton, Oxford, CT (US); Youssef El-Shoubary, North Brunswick, NJ (US); Robert Martin Lowery, Scarsdale, NY (US); Herriot Moise, Putnam Valley, NY (US)

(73) Assignee: PepsiCo, Inc., Purchase, NY (US)

( * ) Notice: Subject to any disclaimer, the term of this patent is extended or adjusted under 35 U.S.C. 154(b) by 1111 days.

(21) Appl. No.: 13/653,927

(22) Filed: Oct. 17, 2012

(65) Prior Publication Data

US 2014/0102047 A1    Apr. 17, 2014

(51) Int. Cl.
*A23L 2/54* (2006.01)
*A23L 2/40* (2006.01)
(Continued)

(52) U.S. Cl.
CPC ...... *A23L 2/54* (2013.01); *A23L 2/40* (2013.01); *B01F 3/04794* (2013.01); *B65B 3/04* (2013.01);
(Continued)

(58) Field of Classification Search
CPC ..... B01F 5/00; B01F 11/0011; B01F 11/0014; B01F 3/04794; B01D 7/00; B65D 85/00; B65D 85/73; B65D 83/625; B65D 83/643; B65D 81/26; B65D 81/28; B65D 81/266; B65D 81/268; B65D 81/2023; B65D 81/207; B65D 51/244; B65D 41/00; B65D 1/02076; A23L 2/40; A23L 2/54; A23L 2/80; B67C 3/22; B67C 3/222; B67C 2003/226; B65B 2220/14; B65B 61/24;
(Continued)

(56) References Cited

U.S. PATENT DOCUMENTS 1,907,301 A * 5/1933 Martin .............................. 62/56
3,333,969 A * 8/1967 Mitchell ................ A23G 9/325
426/285
(Continued)

FOREIGN PATENT DOCUMENTS

CN    1170541 A  *  1/1998  ............ B01F 1/0005
FR    2799137 A1 *  4/2001  ................ A23L 2/54
(Continued)

OTHER PUBLICATIONS

ProQuest translation of CN 1170541, retrieved Aug. 31, 2016, 5 pages.*
(Continued)

*Primary Examiner* — Stephen F Gerrity
(74) *Attorney, Agent, or Firm* — Sterne, Kessler, Goldstein & Fox P.L.L.C.

(57) ABSTRACT

In at least some embodiments, a carbonated beverage is formed by filling a container with a beverage liquid, adding solid carbon dioxide, sealing the container, and then limiting the development of overpressure within the container. In some embodiments, overpressure within a container may be limited by an adsorber material element. In some embodiments, overpressure within a container may be limited through agitation of a sealed container.

24 Claims, 5 Drawing Sheets

(51) Int. Cl.
*B01F 3/04* (2006.01)
*B67C 3/00* (2006.01)
*B67C 3/22* (2006.01)
*B65B 3/04* (2006.01)
*B65B 3/10* (2006.01)
*B65B 7/28* (2006.01)

(52) U.S. Cl.
CPC .............. *B65B 3/10* (2013.01); *B65B 7/2835* (2013.01); *B67C 3/00* (2013.01); *B67C 3/22* (2013.01); *B65B 2220/14* (2013.01)

(58) Field of Classification Search
CPC ......... B65B 31/00; B65B 31/006; B65B 1/04; B65B 3/04; B65B 81/2046; B65B 83/663; B65B 7/2835
USPC ... 53/467, 471, 432, 400, 403, 111 RC, 437; 99/277.2; 62/68; 426/591, 405, 477, 426/392, 397; 366/208, 209, 210, 212; 215/228, 347–349
See application file for complete search history.

(56) References Cited

U.S. PATENT DOCUMENTS

| | | | | |
|---|---|---|---|---|
| 3,607,303 | A * | 9/1971 | Bingham | 426/393 |
| 4,285,977 | A * | 8/1981 | Yezek | A23L 2/54 426/477 |
| 4,460,612 | A * | 7/1984 | Saleeb et al. | A23L 2/54 426/132 |
| 5,804,237 | A * | 9/1998 | Diamond | A23L 3/02 220/609 |
| 6,502,369 | B1 * | 1/2003 | Andison et al. | B65B 3/022 53/275 |
| 6,708,844 | B2 * | 3/2004 | Lim et al. | 222/3 |
| 7,101,077 | B2 * | 9/2006 | Esteve et al. | 366/110 |
| 7,185,786 | B2 * | 3/2007 | Krause et al. | 222/1 |
| 7,604,392 | B2 * | 10/2009 | Brezinsky et al. | 366/211 |
| 7,637,082 | B2 * | 12/2009 | Abercrombie et al. | 53/432 |
| 7,811,645 | B2 * | 10/2010 | Shi | 428/35.7 |
| 7,838,056 | B2 * | 11/2010 | Forgac | B01F 3/04794 426/474 |
| 2004/0026270 | A1 * | 2/2004 | Liang | B65D 51/2821 206/219 |
| 2005/0260309 | A1 * | 11/2005 | Hagemeyer et al. | A23L 2/54 426/330 |
| 2006/0000518 | A1 * | 1/2006 | Allen et al. | B67C 3/222 141/67 |
| 2008/0206433 | A1 * | 8/2008 | Kushner | A23L 2/54 426/598 |
| 2008/0304356 | A1 * | 12/2008 | Zhuang | 366/239 |
| 2010/0024660 | A1 * | 2/2010 | Wallace | B01F 3/04794 99/323.2 |
| 2010/0127008 | A1 * | 5/2010 | Abercrombie et al. | 220/720 |
| 2010/0166915 | A1 * | 7/2010 | Mathisen et al. | A23L 2/54 426/61 |
| 2011/0219731 | A1 * | 9/2011 | Ullmann et al. | B65B 81/2076 53/474 |
| 2013/0340497 | A1 * | 12/2013 | Tata | A23L 2/54 73/1.06 |
| 2014/0004240 | A1 * | 1/2014 | Hatherell | A23L 2/54 426/477 |
| 2015/0164126 | A1 * | 6/2015 | Jun | A23L 2/54 426/590 |

FOREIGN PATENT DOCUMENTS

| | | | | |
|---|---|---|---|---|
| JP | 61231980 | A * | 10/1986 | |
| KR | 101128148 | B1 * | 3/2012 | A23L 2/54 |
| KR | 101190929 | B1 * | 10/2012 | A23L 2/54 |
| WO | WO 9415489 | A1 * | 7/1994 | A23L 2/54 |

OTHER PUBLICATIONS

EPO machine translation of FR 2799137, retrieved Aug. 30, 2016, 10 pages.*

JPO machine translation of JP 61-231980, retrieved Aug. 31, 2016, 4 pages.*

* cited by examiner

POST FILL CARBONATION WITH CONTAINER OVERPRESSURE LIMITATION

BACKGROUND

"Carbonation" refers to dissolving carbon dioxide ($CO_2$) in an aqueous solution. Carbonated beverages are potable liquids into which carbon dioxide ($CO_2$) has been dissolved. One group of carbonated beverages includes carbonated soft drinks (CSDs). Unlike beer, sparkling wine and other beverages that rely on fermentation to achieve carbonation, CSDs are typically non-alcoholic and carbonated by a mechanical mixing process. That mixing process is usually performed in a large reactor and involves high pressure flows of gaseous $CO_2$, low beverage temperatures and large surface area contact between the gaseous $CO_2$ and liquid beverage. The reactors often include spargers, diffusers and/or other equipment used to increase the surface area of liquid/$CO_2$ contact. Carbonation by such mechanical mixing processes is normally performed under super-atmospheric pressure so as to achieve a $CO_2$ concentration in the beverage that exceeds $CO_2$ under atmospheric conditions.

Conventional carbonation of CSDs may require expensive and specialized equipment, particularly when performed on a large scale. Once carbonated, a CSD must usually be maintained at an elevated pressure prior to placing the CSD into a bottle or other consumer product container. When a consumer product container is filled with a CSD, the filling must usually be performed using specialized filling heads that carefully control pressure.

Various attempts have been made to perform carbonation after placing liquid into a consumer product container (i.e., "post-fill"). For example, U.S. Pat. No. 3,607,303 describes placing a syrup-water mixture into a container such as a can. The '303 patent further describes placing a slug of solid $CO_2$ into the container prior to sealing. French patent 2,799,137 and international patent application publication WO 94/15489 similarly describe adding solid carbon dioxide to a liquid in a container prior to sealing of that container.

Post-fill carbonation by addition of solid $CO_2$ (dry ice) poses problems, however. Dry ice vigorously sublimes when it is placed into a liquid having a significantly higher temperature than the dry ice. This sublimation generates gaseous $CO_2$ at a very rapid rate. Because of limited surface area between that gaseous $CO_2$ and the beverage within a sealed container, the rate at which $CO_2$ dissolves into the beverage can be relatively slow. As a result, pressure within the sealed container may rise significantly as the sublimating dry ice gives off gaseous $CO_2$ faster than the gaseous $CO_2$ can be absorbed by dissolution into the beverage. This pressure can deform the container.

Although the prior art has recognized this problem to at least some degree, proposed solutions are less than satisfactory. For example, the aforementioned U.S. Pat. No. 3,607,303 indicates that the beverage should be placed into the container while the beverage is still near its freezing point. This purportedly results in a slug of solid $CO_2$ being encapsulated by an ice film that acts to control the rate of sublimation. As another example, publication WO 94/15489 describes "partially" carbonating the beverage using gaseous $CO_2$ prior to adding solid $CO_2$.

There remains a need for improved methods and systems that permit post-fill carbonation of CSDs while limiting overpressures in a sealed CSD container.

SUMMARY

This Summary is provided to introduce a selection of concepts in a simplified form that are further described below in the Detailed Description. This Summary is not intended to identify key or essential features of the invention.

In at least some embodiments, a carbonated beverage is formed by filling a container with a beverage liquid, adding solid carbon dioxide, sealing the container, and then limiting the development of overpressure within the container.

In some embodiments, a deformable container is at least partially filled with an uncarbonated liquid. Solid carbon dioxide may then be added to the container after it has been at least partially filled. The at least partially filled container with added solid carbon dioxide may then be sealed with a closure that includes an adsorber element. That adsorber element may comprise activated carbon. As the solid carbon dioxide within the sealed container sublimes, gaseous carbon dioxide may be generated at a rate that exceeds a rate at which carbon dioxide may be dissolved into the liquid. As the undissolved carbon dioxide gas rises into a headspace in the container, it is adsorbed by the adsorber element. In this manner, overpressure within the container is limited. As sublimation slows and then stops, and as carbon dioxide gas from the headspace dissolves into the liquid, the previously adsorbed gas is released into the headspace.

In some embodiments, a deformable container is at least partially filled with an uncarbonated liquid. Solid carbon dioxide may then be added to the container after it has been at least partially filled. The at least partially filled container with added solid carbon dioxide may then be sealed. The sealed container may then be agitated. As the container is agitated, the rate at which gaseous carbon dioxide from the subliming solid carbon dioxide may be dissolved in the liquid is increased. This increased rate of dissolution limits overpressure within the sealed container.

Additional embodiments are described herein.

BRIEF DESCRIPTION OF THE DRAWINGS

Some embodiments are illustrated by way of example, and not by way of limitation, in the figures of the accompanying drawings and in which like reference numerals refer to similar elements.

DETAILED DESCRIPTION

In at least some embodiments, a carbonated soft drink (CSD) is formed by filling a container with a beverage liquid, adding solid $CO_2$ (dry ice), sealing the container, and then limiting the development of overpressure within the container. As used herein, "beverage liquid" refers to a liquid that will, upon carbonation, become a CSD. Beverage liquids will typically include water and various flavoring components. In many embodiments, the beverage liquid will be a mixture of water and a syrup and/or other type(s) of concentrated sweetening and/or flavoring agents. An "overpressure" generally refers to a pressure within the container that exceeds a desired equilibrium pressure in the container by more than a minor amount (e.g., by more than 10%). The desired equilibrium pressure may vary based on container design, product formulation, carbonation level and/or other factors. Examples of desired equilibrium pressures in some embodiments in which the container is a polyethylene terephthalate (PET) bottle are between about 30 psig to about 60 psig at room temperature. In some embodiments, 45 psig (at room temperature) is a preferred equilibrium pressure.

Figure 1:
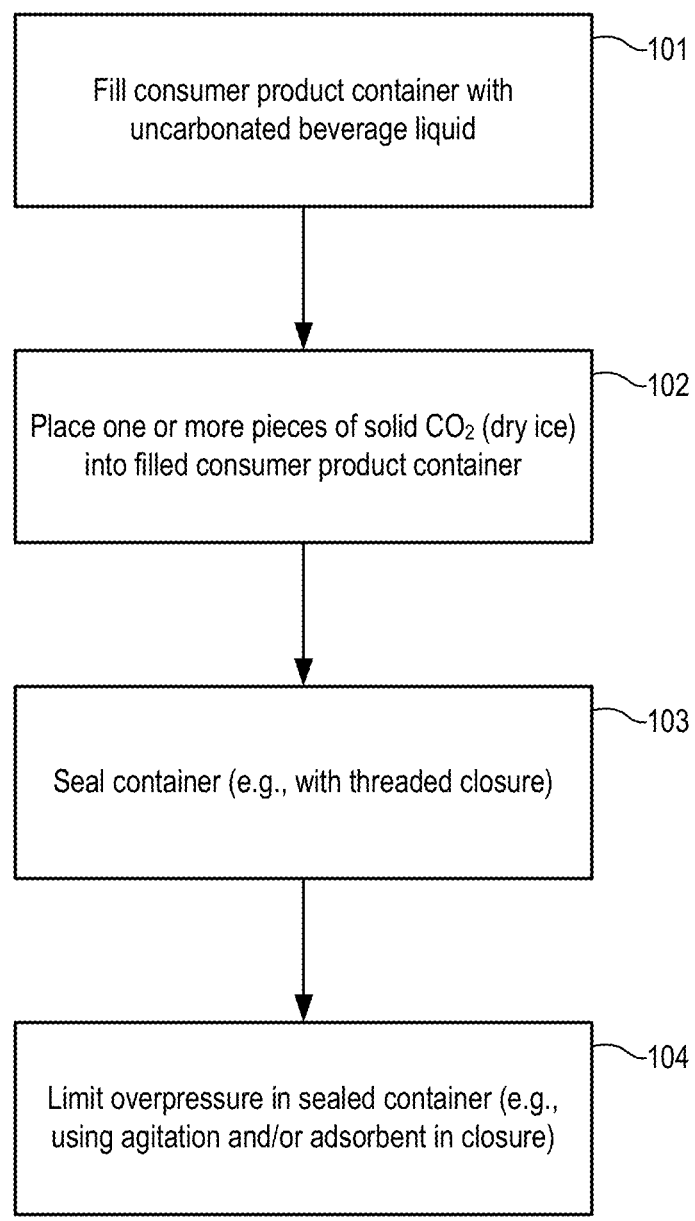
FIG. 1 is a block diagram showing steps of a method, according to at least some embodiments, for post-fill carbonation with overpressure prevention and/or limitation.

FIG. 1 is a block diagram showing steps of a method 100 for performing post-fill carbonation according to at least some embodiments. In step 101, a consumer product container is at least partially filled with an uncarbonated beverage liquid. In some embodiments, a consumer product container may be a container intended for retail distribution. The container may be formed from, e.g., a deformable plastic. In at least some embodiments, the consumer product container is a PET bottle having an internal volume of two liters or less.

In step 102, one or more pieces of solid $CO_2$ ("dry ice") are placed into the at least partially filled consumer product container. As discussed in more detail below, the dry ice may have a density above 1 gram per cubic centimeter (g/cc). As also discussed below, dry ice may have any of a variety of shapes and may be manufactured and dispensed into the container in various ways.

In step 103, the container is sealed. In at least some embodiments, the container is sealed by applying a threaded closure.

In step 104, overpressure within the container is limited. In some embodiments, overpressure is limited in step 104 by use of an adsorber material held within the closure used to seal the container. As explained in further detail below, such an adsorber acts as a "shock absorber" to adsorb $CO_2$ that is released from the sublimating dry ice and not initially dissolved in the beverage liquid. The adsorbed $CO_2$ is then released as $CO_2$ dissolves into the beverage liquid. In other embodiments, overpressure is limited in step 104 through agitation of the sealed container. As explained in further detail below, the agitation may be performed in a manner so as to prevent internal pressure within the sealed container from reaching a level (e.g., about 135 psig) at which the container could potentially deform. In still other embodiments, overpressure is limited in step 104 through use of an adsorber in combination with agitation.

Figure 2A:
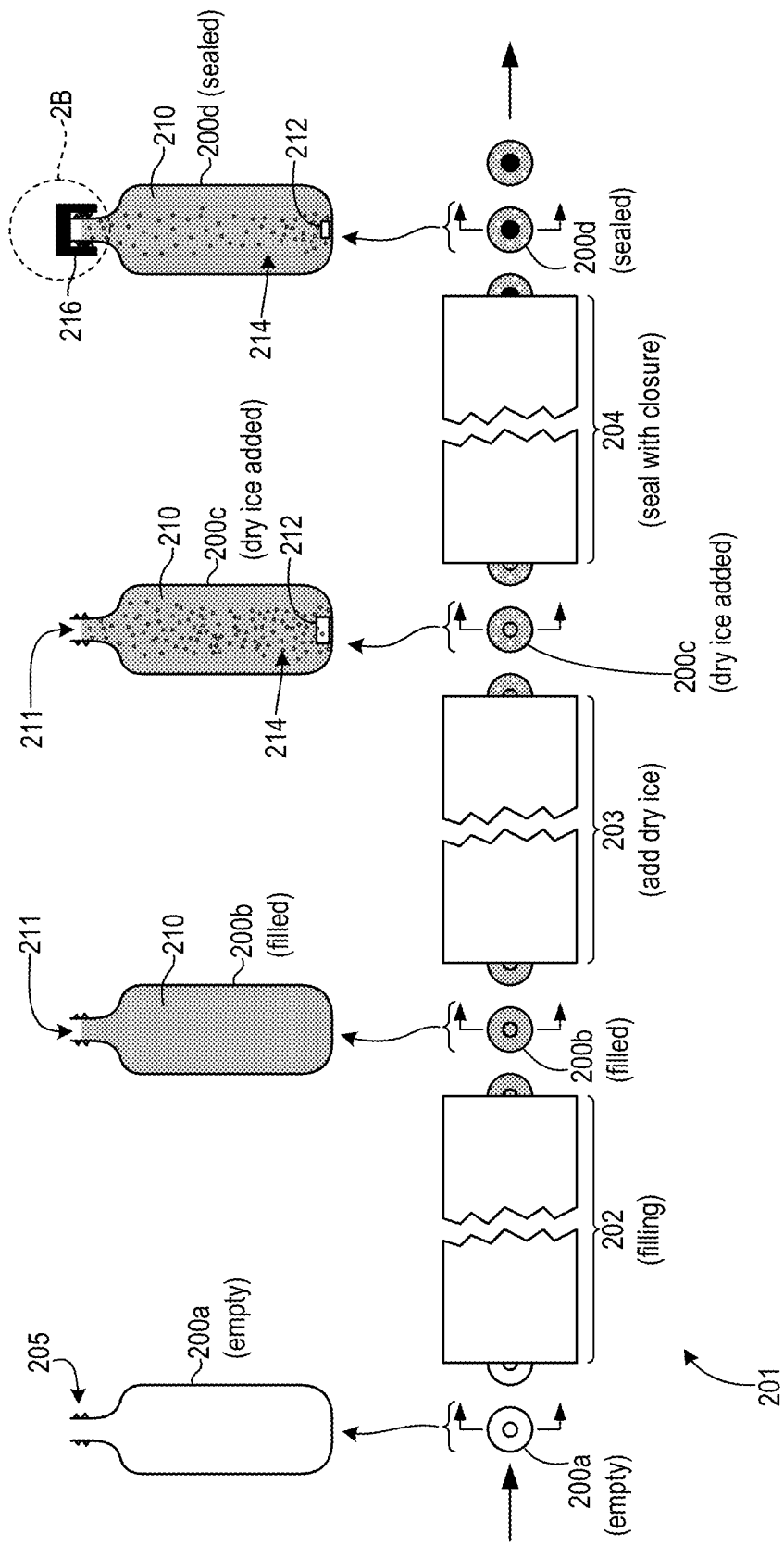
FIG. 2A is a partially schematic diagram showing performance of a method according to some embodiments.

FIG. 2A is a partially schematic diagram showing performance of method 100 according to some embodiments. In particular, FIG. 2A shows a series of consumer product containers 200 as they progress along a filling and capping production line 201. Containers 200 are carried by a conveyer belt (not shown) or other known mechanism for transporting beverage containers in a production environment. Several of containers 200 are further identified by appended letters "a" through "d" for purposes of subsequent discussion.

As containers 200 progress along production line 201, they pass through a number of production line segments 202, 203 and 204. While traveling through first production line segment 202, containers 200 are filled with a beverage liquid. While traveling through second production line segments 203, one or more pieces of dry ice are deposited into each filled container 200. While traveling through third production line segments 204, each container 200 is sealed with a closure. Additional aspects of operations performed during each of segments 202-204 are discussed below.

For convenience, FIG. 2A shows production line 201 as a straight path. Similarly, each of segments 202-204 is represented in FIG. 2A as simple block positioned along part of that straight path. In some embodiments, however, one or more of parts of the production line 201 path may be arcuate. For example, filling operations of segment 202 may be performed by a rotating filling machine having multiple filling heads located at stations that are radially offset from a center of rotation for the filling machine. As the filling machine rotates, each of those filling heads would move in a circular path. The segment 202 portion of line 201 may then have an arced path that matches a portion of the circular path traveled by each of the filling heads. As each of containers 200 travels around the arcuate path portion of segment 202, one of the fill heads may connect to the container and remains connected while the container is traveling through segment 202. In this manner, containers 200 could be filled while they remain in motion along production line 201.

The dry ice delivery operations of segment 203 may also be performed by heads of a delivery machine configured to rotate about a center. The portion of the production line path corresponding to segment 203 could also be arced so as to match a portion of the circular path traveled by the heads of the dry ice delivery machine. In this manner, dry ice could be delivered into containers 200 as they remain in motion along production line 201. Similarly, sealing operations of segment 204 may be performed by heads of a capping machine configured to rotate about a center. The portion of the production line path corresponding to segment 204 could be arced so as to match a portion of the circular path traveled by the heads of the capping machine. In this manner, containers 200 could be sealed as they remain in motion along production line 201.

In some embodiments, the operations of one or more of segments 202-204 may performed by a single device. For example, a single machine may be configured to both deliver dry ice into a container and to then apply a closure. In some such embodiments, a dry ice delivery and capping machine may have a number of heads that rotate around a center and travel a circular path. As a filled container 200 approaches the dry ice delivery and capping machine, one of those heads may attach to the container and remain attached while the container travels the portion of the production line path corresponding to the dry ice delivery and capping machine. The attached head could first deliver dry ice into the container as the head and container travel a first part of the arcuate path. The attached head could then apply a closure as the head and container travel a subsequent part of the arcuate path.

Returning to FIG. 2A, the direction in which containers 200 travel on production line 201 is indicated by arrows. Empty container 200a is about to enter filling segment 202 and is exemplary of other containers 200 prior to entering filling segment 202. FIG. 2A further shows an enlarged area cross-sectional view of container 200a taken along the indicated sectioning plane. In the embodiment of FIG. 2A, containers 200 (including container 200a) are conventional PET beverage bottles. Each of containers 200 includes a neck region having a threaded finish portion 205 onto which a closure may be secured, as further described below.

In segment 202, containers 200 are filled with an uncarbonated beverage liquid 210. That beverage liquid may be a combination of water and/or sweeteners and/or other flavoring agents. During the filling operations of segment 202, the beverage liquid can be dispensed into containers 200 at atmospheric pressure. Moreover, and unlike conventional filling heads for bottling of CSDs, it is not necessary for the filling heads in segment 202 to form a seal with bottles 200. In at least some embodiments, beverage liquid 210 is dispensed into containers 200 at ambient (or at near ambient) temperatures. Exemplary delivery temperatures for beverage liquid 210 in some such embodiments include, without limitation, above 15° C., above 20° C. or above 25° C. In some embodiments, it may be desirable to chill the beverage liquid slightly. Exemplary delivery temperatures for the slightly chilled beverage liquid in some such embodiments include, without limitation, approximately 10° C., approximately 8° C., and between approximately 5°-10° C.

Container 200b in FIG. 2A has just exited segment 202 and is about to enter dry ice addition segment 203. Container 200b is exemplary of containers 200 exiting segment 202. FIG. 2A further shows an enlarged area cross-sectional view of container 200b taken along the indicated sectioning plane. As seen in that area cross-sectional view, container 200b has been filled with uncarbonated beverage liquid 210. A small head space 211 remains between the surface of liquid 210 and the upper edge of finish portion 205. In some embodiments, and for reasons explained below, head space 211 is occupied by ordinary air when a container 200 exits filling segment 202. In other words, and unlike many conventional CSD filling operations, bottles 200 may not be purged with gaseous $CO_2$ during filling segment 202 in some embodiments.

In segment 203, dry ice is added to filled containers 200. In at least some embodiments, the dry ice placed into each container 200 is of a certain density and has a predefined shape. In particular, the rate of sublimation increases as dry ice density drops and as dry ice surface area increases. Accordingly, in some embodiments, the density of the dry ice added to containers 200 is maximized and/or the shape of the added dry ice pieces selected so as to minimize surface area. Exemplary values for the density of the added dry ice pieces include, without limitation, approximately 1.34 g/cc or greater, approximately 1.30 g/cc or greater, approximately 1.25 g/cc or greater, approximately 1.20 g/cc or greater, approximately 1.15 g/cc or greater, and greater than 1 g/cc. Exemplary shapes for added dry ice pieces include spheres, cubes, cuboids, prisms, and cylinders.

Dry ice can be manufactured for use in segment 203 in any of various ways. In some embodiments, a high pressure die can be used to solidify liquid $CO_2$ to a desired density. In other embodiments, a low density dry ice powder (or dry ice snow) can be produced by release of high pressure liquid $CO_2$ through an appropriate nozzle. The resulting powder can be compacted into pellets having a desired density and shape. In still other embodiments, sudden temperature change can be used to solidify $CO_2$ liquid or gas. In some embodiments materials such as water, sugar(s), gum(s) and other additives can be entrained into the $CO_2$ as dry ice pellets are formed. Such additives may be included to control the rate of sublimation, to achieve concurrent dosing of the additive with the dry ice, and/or for other purposes.

In some embodiments, dry ice pellets may be sized by controlling pressure and dimensions of exit piping from the dry ice production unit. Dry ice pellets could also be sized by use of a reciprocating or rotating cutting device that slices pellets from a continuously formed rod of dry ice. In some embodiments the size of a pellet may be controlled by size, shape and/or volume of a die, mold, capsule or other device which constrains pellet shape and size during compaction. In still other embodiments the size of a pellet may be controlled through modulation of pressure or pressing time during compaction or extrusion.

Single or multiple pellets can be added to each container 200 so as to achieve a desired carbonation level. The total amount of dry ice added to a container 200 (in grams) will depend on the desired carbonation level and on the size of container 200. As but one example, for a 20 fluid ounce (approximately 590 cc) PET container, 4.6 grams of dry ice can be added to yield approximately 4 volumes gaseous of $CO_2$ in the container. Additional dry ice can be added to account for losses during delivery and for losses due to sublimation prior to sealing of the container. Density, shape and number of dry ice pellets added to each container can also be adjusted to account for such losses and for other process parameters (e.g., filling temperature, desired carbonation level).

Once formed, dry ice pellets can be added to containers 200 using any of a variety of mechanisms. Such mechanisms include, without limitation, gravity feed from a storage hopper or from a source of dry ice manufacture (e.g., slicing of pellets from a continuously formed dry ice rod). Such mechanisms can also include an indexing/magazine system, which system may include an intermediate storage hopper and may be fitted with a rotating feed wheel, a rotary valve or other type of singling device. Such mechanisms could also include transport from a separate location via a line of suitable diameter. A transport energy input (e.g., compressed $CO_2$ gas) could be used within such a line to propel dry ice pellets through the line. In some embodiments there may be a valve located at the point of dosing above the beverage container.

Container 200c in FIG. 2A has just exited segment 203 and is about to enter sealing segment 204. Container 200c is exemplary of containers 200 exiting segment 203. FIG. 2A further shows an enlarged area cross-sectional view of container 200c taken along the indicated sectioning plane. As seen in that area cross-sectional view, a pellet 212 of dry ice has been added to container 200c. As pellet 212 sublimes, bubbles 214 of gaseous $CO_2$ are generated and travel upward to headspace 211.

Because $CO_2$ is denser than air, gaseous $CO_2$ from rising bubbles 212 displaces air in headspace 211. In some embodiments, sealing of containers 200 after dry ice addition is slightly delayed so that this gaseous $CO_2$ can displace all or most of any air that remained in headspace 211 after filling with beverage liquid 210. This minimizes the amount of oxygen remaining in a sealed beverage container. This allows filling operations during segment 202 to omit air purging steps common to conventional CSD filling equipment.

In segment 204, closures are applied to the finish portions 205 of containers 200 so as to seal those containers. Container 200d in FIG. 2A has just exited segment 204 and has been sealed with a closure 216. Container 200d is exemplary of containers 200 exiting segment 204. FIG. 2A further shows an enlarged area cross-sectional view of container 200d taken along the indicated sectioning plane. As seen in that area cross-sectional view, dry ice pellet 212 continues to sublime and generate bubbles 214 of gaseous $CO_2$. Although some of the gaseous $CO_2$ from rising bubbles 214 dissolves in beverage liquid 210 immediately, much of that $CO_2$ reaches headspace 211. So as to limit overpressure within container 200 resulting from $CO_2$ accumulating in headspace 211, closure 216 includes an adsorber material.

Figure 2B:
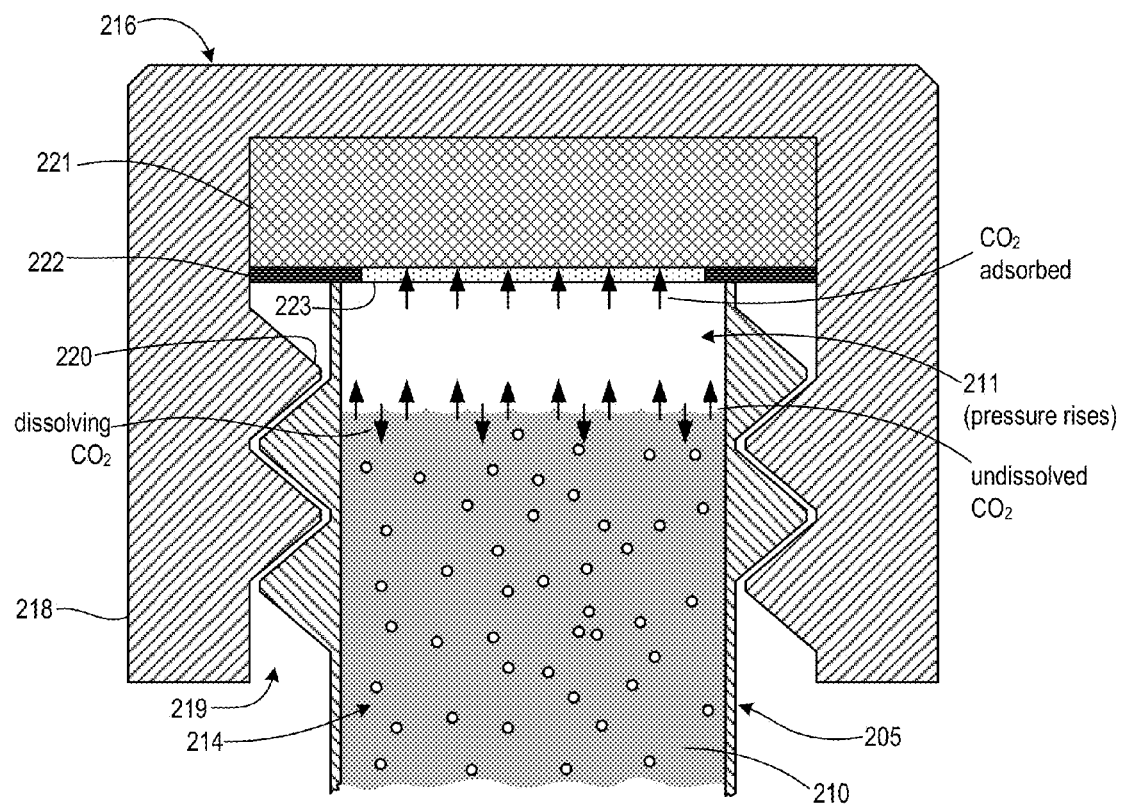
FIG. 2B shows an enlarged portion of an area cross-sectional view of a sealed container during the method of FIG. 2A.

FIG. 2B shows an enlarged portion of the area cross-sectional view of sealed container 200d. Closure 216 includes a housing 218. The outer shape of housing 218 is generally cylindrical. A cavity 219 in the underside of housing 218 is configured to receive finish portion 205 of the container 200d neck. Threads 220 on the inner wall of cavity 219 correspond to threads on finish portion 205 and hold closure 216 in place. The upper portion of cavity 219 holds an adsorber material element 221. A liner 222 holds element 221 in place and acts to seal the open end of container 200d when pressed against the upper edge of the container opening. A central portion 223 of liner 222 is gas permeable so that $CO_2$ can pass between headspace 211 and element 221. In some embodiments the liner material may be permeable to $CO_2$ gas but not to the beverage liquid, so that the sorbent and beverage liquid do not come into direct contact.

As $CO_2$ bubbles 214 rise, undissolved $CO_2$ from bubbles 214 reaches headspace 211. This causes the pressure within headspace 211 to rise. As a result of this increased pressure in headspace 211, $CO_2$ passes through central portion 223 and is adsorbed by element 221. Also as a result of this increased pressure, $CO_2$ within headspace 211 dissolves into liquid 210. This process continues as more $CO_2$ reaches headspace 211. Because element 221 continues to adsorb $CO_2$, however, the pressure rise within headspace 211 is limited.

Figure 2C:
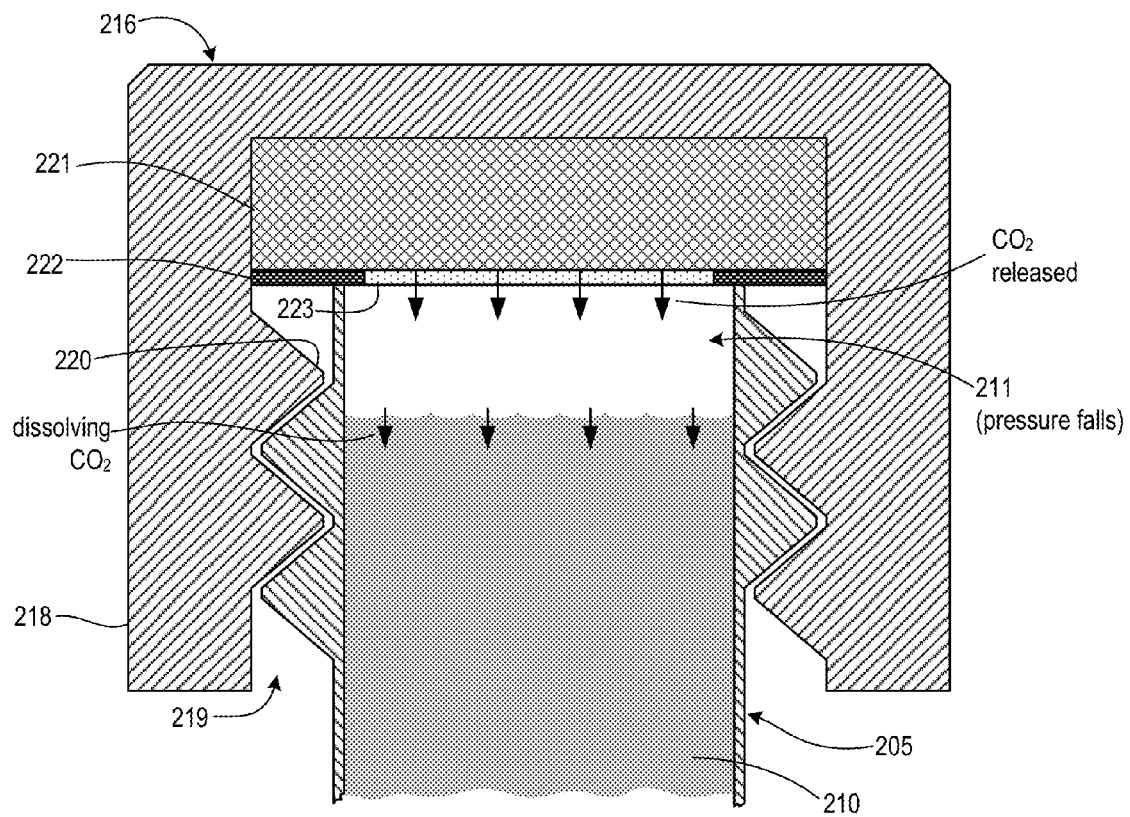
FIG. 2C shows an enlarged portion of an area cross-sectional view of the sealed container of FIG. 2B at a subsequent time.

Ultimately, the flow of undissolved $CO_2$ into headspace 211 from liquid 210 will slow and then cease as dry ice pellet 212 (FIG. 2A) completely sublimes. FIG. 2C is an enlarged cross-sectional view of container 200d from the same location as FIG. 2B, but at a time shortly after pellet 212 has finished sublimation. As the flow of $CO_2$ bubbles 214 slows, the amount of undissolved $CO_2$ reaching headspace 211 diminishes. As a result, the pressure within headspace 211 stops rising and the flow of $CO_2$ into element 221 stops. The pressure in headspace 211, although limited by the action of adsorber material element 221, is still sufficient to cause of $CO_2$ within headspace 211 to dissolve into liquid 210. As $CO_2$ from headspace 211 dissolves into liquid 210, pressure in headspace 211 falls slightly. The causes element 221 to release previously adsorbed $CO_2$ back into headspace 211. This in turn keeps the pressure within headspace 211 sufficiently high to continue dissolution of $CO_2$ into liquid 210. The process continues until a state of equilibrium is reached, which state also corresponds to liquid 210 achieving a desired carbonation level.

In some embodiments, caps 216 can be pre-manufactured with adsorbent material inserts 221 and loaded into a capping machine. In at least some embodiments, the adsorbent inserts of caps 216 are not precharged with $CO_2$ prior to sealing a container 200 and are stored at atmospheric pressure. In at least some embodiments, the adsorber material used for inserts 221 is activated carbon. In some other embodiments, other adsorber materials (e.g., aminated SBA-151, SBA-HA2, tertiary amine, K—Li2ZrO3/Li2ZrO3, MCM-413, K-HTlc4, hydrotalcites (HTlc), Mg—Al—CO3 HTlc, zeolites (e.g., 13×), basic alumina. metal organic frameworks (MOFs)) may be used for inserts 221. Similarly, combinations of other adsorber materials and/or combinations of activated carbon with one or more adsorber materials could be used. In at least some preferred embodiments, however, only activated carbon is used. Activated carbon is safe and substantially cheaper than many other adsorber materials.

Figure 3:
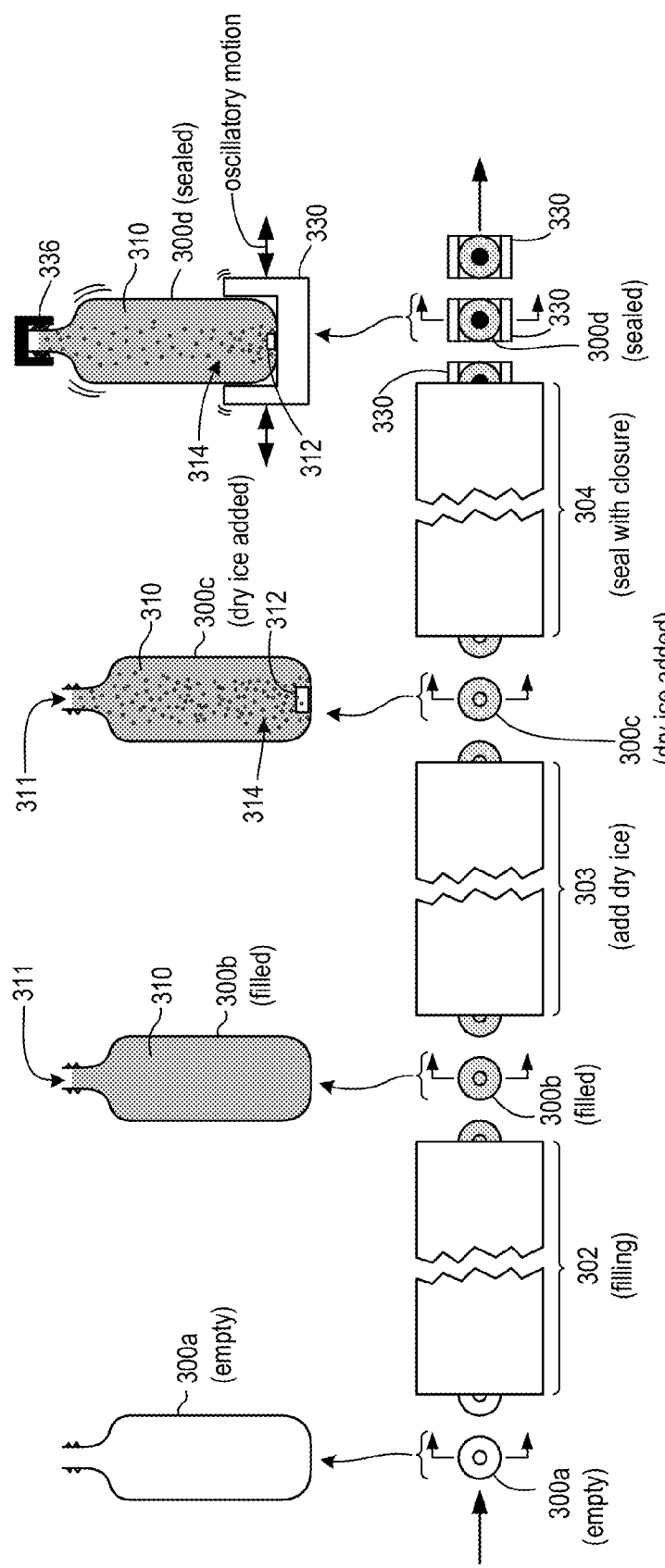
FIG. 3 is a partially schematic diagram showing performance of a method according to some additional embodiments.

FIG. 3 is a partially schematic diagram showing performance of method 100 according to some additional embodiments. As with FIG. 2A, FIG. 3 shows a series of consumer product containers 300 as they progress along a filling and capping production line 301. Containers 300, which may be similar to containers 200, are carried by a conveyer belt (not shown) or other known mechanism for transporting beverage containers in a production environment. Several of containers 300 are further identified by appended letters "a" through "d" for purposes of subsequent discussion.

As containers 300 progress along production line 301, they pass through a number of production line segments 302, 303 and 304. While traveling through first production line segment 302, containers 300 are filled with a beverage liquid 310. Segment 302 may be similar to segment 202 of FIG. 2A. Filling operations of segment 302 may be performed in a manner similar to the filling operations of, and using filling equipment similar to that used for, segment 202. While traveling through second production line segments 303, one or more pieces of dry ice 312 are deposited into each filled container 300. Segment 303 may be similar to segment 203 of FIG. 2A. Dry ice addition operations of segment 303 may be performed in a manner similar to the dry ice addition operations of, and using equipment similar to that used for, segment 203 of FIG. 2A. While traveling through third production line segment 304, each container 300 is sealed with a closure. Except as indicated below, sealing operations of segment 304 may be performed in a manner similar to the sealing operations of, and using capping equipment similar to that used for, segment 204 of FIG. 2A. Unlike segment 204, however, containers 300 are sealed with a conventional closure 336 in segment 304. In particular, closure 336 lacks an adsorber material insert. Instead, overpressure within sealed containers 300 is limited using agitation of sealed containers. As explained in further detail below, such agitation is performed using an agitating carrier 330. As with production line 201 of FIG. 2A, the operations of one or more of segments 302-304 may performed by a single device.

Empty container 300a is about to enter filling segment 302 and is exemplary of other containers 300 prior to entering filling segment 302. As shown in the enlarged area cross-sectional view, container 300a is initially empty. Container 300b has just exited segment 302 and is about to enter dry ice addition segment 303. Container 300b is exemplary of other containers 300 exiting segment 302. As shown in the enlarged area cross-sectional view, container 300b has been filled with uncarbonated beverage liquid 310 and has a small headspace 311. Container 300c has just exited segment 303 and is about to enter sealing segment 304. Container 300c is exemplary of other containers 300 exiting segment 303. As shown in the enlarged area cross-sectional view, a dry ice pellet 312 has been added to container 300c. Bubbles 314 of gaseous $CO_2$ are released as pellet 312 sublimes. As with the embodiment of FIG. 2A, sealing of containers 300 after dry ice addition may be slightly delayed so that this gaseous $CO_2$ can displace all or most of any air that remains in headspace 311 after filling with beverage liquid 310.

Container 300d has just exited segment 304 and has been sealed with a conventional closure 336. Container 300d is exemplary of containers 300 exiting segment 304. After each container 300 is sealed in segment 304, the container is placed onto an agitating carrier 330. Each of carriers 330 could be separately powered and coupled to a conveyor belt (not shown). Each carrier 330 may contain an oscillatory motor, an ultrasonic transducer, or another mechanism for imparting agitations to a sealed bottled 300.

As shown in the enlarged area cross-sectional view of container 300d, each carrier 330 is configured to securely hold a sealed container and to impart an oscillatory motion perpendicular to the sidewalls and longitudinal axis of the held container. This motion increases the rate at which gaseous $CO_2$ in bubbles 314 are dissolved into liquid 310. As a result, less gaseous $CO_2$ reaches headspace 311 and the pressure rise within headspace 311 is limited.

In some embodiments, agitation of sealed containers 300 is performed at a rate sufficient to keep pressure within the container below a level at which deformation may occur. This pressure level, and thus the required intensity of agitation, may vary based on container design and other parameters. In at least some embodiments, however, agitation is performed at a rate of at least 150 oscillations per minute (OPM). In some embodiments, that rate is at least 200 OPM. Agitation of sealed containers 300 may be performed until the internal container pressure reaches equilibrium and $CO_2$ dissolution has reached a desired level. Although this duration may also vary based on certain parameters, in at least some embodiments the agitation is performed for at least 150 seconds.

Various embodiments include numerous additional variations. Other types of devices can be used to impart agitation to sealed containers. As one example, reciprocating and vibratory conveyor systems could be utilized. A vibratory table could receive sealed containers as they exit a capping machine. The table could be inclined to assist movement of the sealed containers along the table, and/or pusher bars could be used to push filled containers across the table at a desired speed. As another example, rotary and/or centrifugal action conveyors (with or without eccentric ranges of motion) could be employed. As a further example, linear conveyors with inversion stages and/or disturbed horizontal/vertical pathways could be utilized.

In some embodiments, features of the embodiments of FIGS. 2A and 3 are combined. In particular, and in a manner similar to that described in connection with FIG. 2A, containers could be sealed with closures having adsorber material inserts. Those sealed containers could then be agitated in a manner similar to that described in connection with FIG. 3. By combining use of an adsorber insert with agitation, the intensity and/or duration of agitation can be reduced, and/or the amount of adsorber material needed in each closure could be reduced.

As can be appreciated from the foregoing, post-fill carbonation methods according to various embodiments offer numerous advantages. If carbonation is performed after filling of a container with a beverage liquid, the filling equipment can be simplified. For example, it is no longer necessary to form a seal between the filling head and the container during the filling process. Simplification of filling equipment can further facilitate use of the same production line for CSDs and for other types of beverages with minimal equipment changeovers. For example, the same equipment used to fill containers with CSD beverage liquid could be used for aseptic filling (e.g., for dairy-based products). That same equipment could also be used for hot-filling applications by setting up a simple return loop. If production line 201 were used for a beverage other than CSDs, for example, dry ice addition segment 203 could be deactivated and sealing segment 204 used to seal containers with conventional closures. If production line 301 were used for beverages other than CSDs, segment 303 could be deactivated and an alternate conveyor system (without agitation elements) configured to receive the output of segment 304.

Post-fill carbonation of CSDs may also permit production lines to run at faster speeds. In particular, the speed at which CSD containers are conventionally filled is often limited to reduce foaming. If a liquid is not carbonated prior to filling a container with that liquid, however, foaming of the liquid during filling is less of a concern and the container can be filled at a more rapid rate.

Embodiments include methods such as are described herein and systems configured to perform methods such as are described herein.

The foregoing description of embodiments has been presented for purposes of illustration and description. The foregoing description is not intended to be exhaustive or to limit embodiments to the precise form explicitly described or mentioned herein. Modifications and variations are possible in light of the above teachings or may be acquired from practice of various embodiments. The embodiments discussed herein were chosen and described in order to explain the principles and the nature of various embodiments and their practical application to enable one skilled in the art to make and use these and other embodiments with various modifications as are suited to the particular use contemplated. Any and all permutations of features from above-described embodiments are the within the scope of the invention.

The invention claimed is:

1. A method comprising:
   filling a deformable container with an uncarbonated beverage liquid while the uncarbonated beverage liquid is at a temperature of at least 10° C., and leaving a small headspace above the liquid in the filled container;
   adding solid carbon dioxide to the filled container;
   sealing the container with a closure after adding the solid carbon dioxide, wherein the closure includes an adsorber material insert comprising activated carbon; and
   limiting overpressure within the container after sealing such that internal pressure does not exceed 135 psig.

2. The method of claim 1, further comprising:
   limiting pressure within the sealed container by adsorbing carbon dioxide into the activated carbon while a rate of carbon dioxide gas release from sublimation of the solid carbon dioxide exceeds a rate at which carbon dioxide gas is dissolved into the beverage liquid.

3. The method of claim 2, further comprising:
   releasing adsorbed carbon dioxide from the activated carbon as carbon dioxide gas dissolves into the beverage liquid within the sealed container.

4. The method of claim 1, wherein the beverage liquid comprises water and at least one of a sweetener and a flavoring agent.

5. The method of claim 1, wherein the filling step comprises filling the deformable container while the uncarbonated beverage liquid is at atmospheric pressure.

6. The method of claim 1, wherein the adding solid carbon dioxide step comprises adding a solid carbon dioxide pellet having a density of at least 1.2 grams per cubic centimeter.

7. The method of claim 1, further comprising:
   agitating the sealed container.

8. The method of claim 1, wherein the deformable container comprises a deformable plastic container.

9. The method of claim 8, wherein the deformable plastic container is a polyethylene terephthalate container.

10. The method of claim 1, wherein the closure insert is not pre-charged with carbon dioxide gas.

11. The method of claim 1, wherein the amount of solid carbon dioxide added is sufficient to generate gaseous carbon dioxide having 4 times the volume of the container.

12. The method of claim 1, further comprising:
   limiting pressure within the sealed container after sealing such that internal pressure does not exceed 66 psig.

13. A method comprising:
filling a deformable container with an uncarbonated beverage liquid while the uncarbonated beverage liquid is at a temperature of at least 10° C., and leaving a small headspace above the liquid in the filled container;
adding solid carbon dioxide to the filled container;
sealing the container;
agitating the sealed container; and
limiting overpressure within the container after sealing such that the container does not deform and such that internal pressure does not exceed 135 psig.

14. The method of claim 13, wherein the agitating the sealed container step comprises agitating the sealed container in a direction perpendicular to sidewalls of the container.

15. The method of claim 14, further comprising agitating the sealed container for at least 150 seconds.

16. The method of claim 13, wherein the agitating the sealed container step comprises agitating the sealed container at a speed of at least 150 oscillations per minute.

17. The method of claim 13, wherein the deformable container comprises a deformable plastic container.

18. The method of claim 17, wherein the deformable plastic container is a polyethylene terephthalate container.

19. The method of claim 13, wherein the adding solid carbon dioxide step comprises adding a solid carbon dioxide pellet having a density of at least 1.2 grams per cubic centimeter.

20. The method of claim 13, wherein the sealing the container step comprises sealing the container with a closure that does not include an adsorber material.

21. The method of claim 13, wherein the sealing the container step comprises sealing the container with a closure that includes an adsorber material insert.

22. The method of claim 21, wherein the closure insert is not pre-charged with carbon dioxide gas.

23. The method of claim 13, wherein the amount of solid carbon dioxide added is sufficient to generate gaseous carbon dioxide having 4 times the volume of the container.

24. The method of claim 13, further comprising:
limiting pressure within the sealed container after sealing such that internal pressure does not exceed 66 psig.

* * * * *